No. 756,144. PATENTED MAR. 29, 1904.
L. A. ROBERTS.
MIXING AND KNEADING MACHINE.
APPLICATION FILED JUNE 27, 1903.
NO MODEL. 2 SHEETS—SHEET 1.
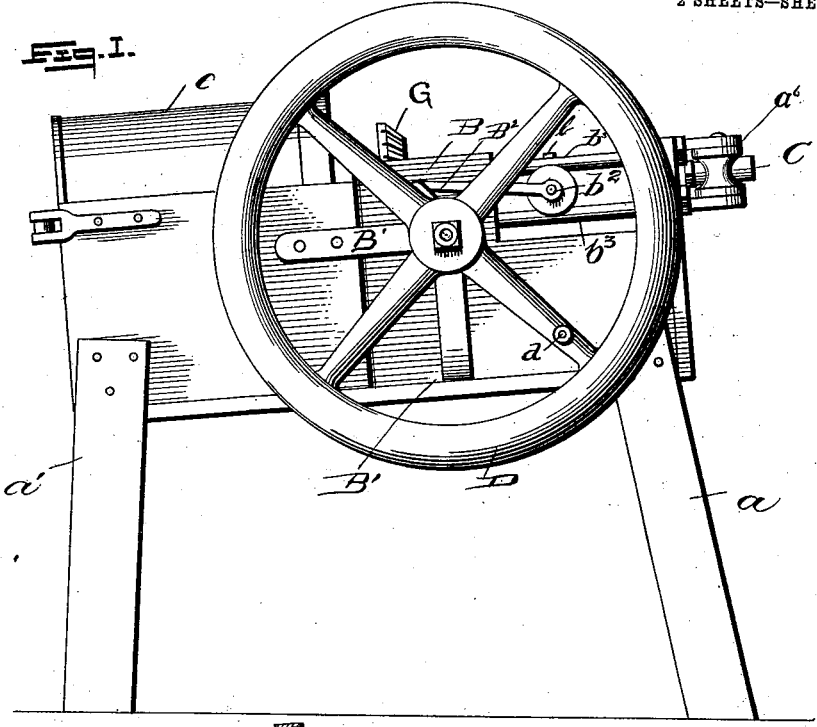
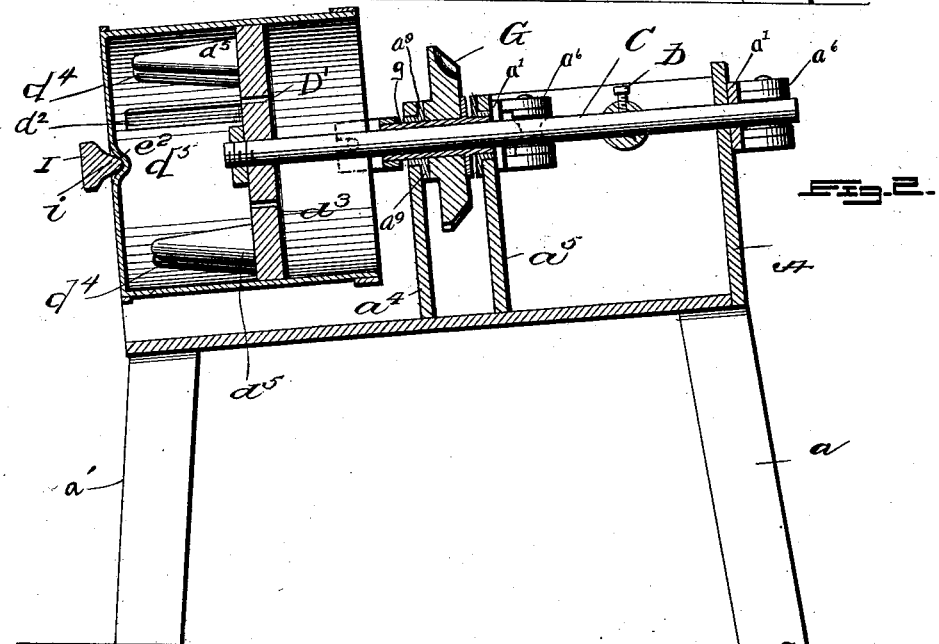
Witnesses
Thomas Durant
Durant Church.
Inventor
Lewis A. Roberts
Church & Church
his Attorneys
THE NORRIS PETERS CO., PHOTO-LITHO., WASHINGTON, D. C.

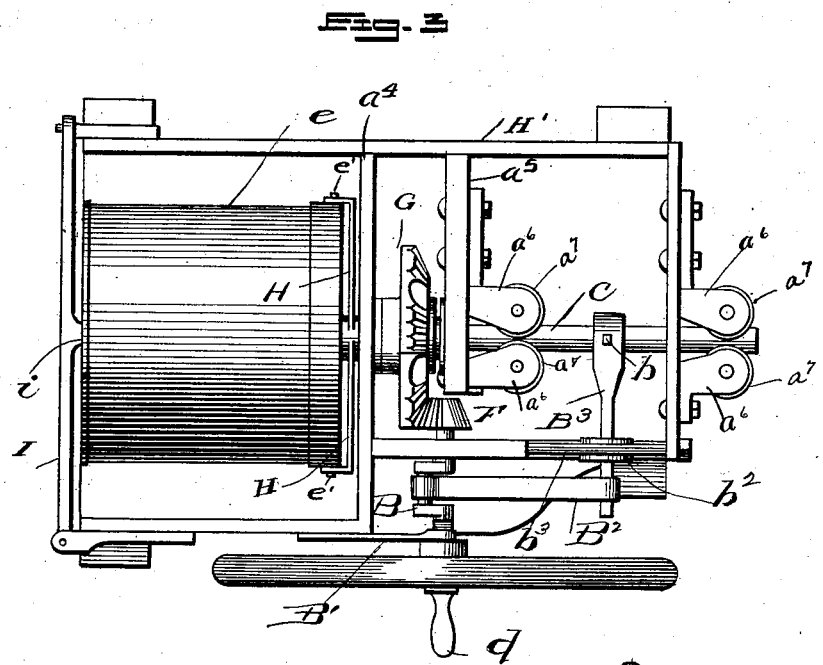

No. 756,144. Patented March 29, 1904.

UNITED STATES PATENT OFFICE.

LEWIS A. ROBERTS, OF CARBONDALE, PENNSYLVANIA.

MIXING AND KNEADING MACHINE.

SPECIFICATION forming part of Letters Patent No. 756,144, dated March 29, 1904.

Application filed June 27, 1903. Serial No. 163,390. (No model.)

*To all whom it may concern:*

Be it known that I, LEWIS A. ROBERTS, a citizen of the United States, residing at Carbondale, in the county of Lackawanna and State of Pennsylvania, have invented certain new and useful Improvements in Mixing and Kneading Machines; and I do hereby declare the following to be a full, clear, and exact description of the same, reference being had to the accompanying drawings, forming a part of this specification, and to the letters of reference marked thereon.

This invention relates to improvements in machines for mixing and kneading dough or batter for bread and cake making, and has for its object to provide a machine which will simulate or produce the effect of hand-kneading and to simplify the construction whereby the machine may be built in compact and light form, readily adapting it for domestic purposes.

To these ends the invention consists in certain novel details of construction and combination and arrangement of parts, all as will be now described and the particular features of novelty pointed out in the appended claims.

In the accompanying drawings, Figure 1 is a side elevation of a machine embodying this invention. Fig. 2 is a longitudinal sectional view. Fig. 3 is a top plan view. Fig. 4 is a rear elevation with the dough or batter receptacle removed.

Similar letters of reference in the several figures indicate the same parts.

The operating parts of the device are carried by a suitable boxing or framework A of any suitable material, wood being preferably employed for lightness. This framework A is mounted upon supports or legs $a$ $a'$, the legs $a'$ being somewhat shorter than the legs $a$ to cause the kneading mechanism to stand at an incline, as shown in Figs. 1 and 2, for a purpose to be hereinafter explained.

Journaled in bearings in the side of the casing or framework A and bracket B' is a cranked shaft B, from which reciprocatory motion is imparted through a pitman or rod $B^2$ to an arm $B^3$, adjustably secured to piston-rod C by set-screw $b$. The arm $B^3$ is preferably guided by a cross-head formed by a roller $b^2$, running on ways or guide-rods $b^3$.

The shaft B carries a power or fly wheel D, usually provided with a handle $d$, whereby the wheel may be turned and the piston-rod C reciprocated as described.

The piston-rod C carries at its end a kneading-head D', preferably provided with mixing-blades $d^4$ $d^5$ and a scraper $d^2$, the head D' working within a receptacle $e$ for the dough to be mixed and kneaded. If desired, holes $d^3$ may be formed in the head D' for the passage of air when the head is working. To give the best results, it is desirable that the batch of dough in the receptacle $e$ be turned over from time to time while the kneading-head D' is reciprocating, and for this purpose the receptacle $e$ is given an intermittent rotating movement through the following preferred instrumentalities: Upon the inner end of cranked shaft B there is mounted a mutilated pinion F, adapted to mesh with a larger gear-wheel G, also mutilated. The hub $g$ of gear G extends on each side of the wheel and is journaled in partition $a^4$ $a^5$, extending across the frame or casing A, said bearings in the partition having suitable metallic bushings $a^9$ to prevent wear, as the partitions are preferably of wood.

The hub $g$ extends through the partition $a^4$ and carries cross-arms H, having right-angle extensions with open-ended slots therein. The receptacle $e$ has lugs or projections $e'$ near its top, adapted to fit in the open-ended slots $h$ in the bent ends of the cross-arms H. To hold the receptacle $e$ in place and form a journal at its rear end, a locking-bar I is provided, usually hinged to one side of the casing A and provided centrally with a lug or pin $i$ adapted to enter a recess $e^2$ in the bottom of the receptacle E, the bar I being locked in any suitable manner to the opposite side of the casing A, as shown clearly in Fig. 4. With this construction it will be seen that when the gear-wheel G turns the receptacle E is given an intermittent rotary motion.

The piston-rod C extends through the partition $a^4$ $a^5$, through the hub $g$ of the gear-wheel G, and through the rear wall of the frame A. Bearings for the rod are mounted on the partition $a^5$ and rear wall of the casing, such bearings being preferably formed by rollers $a^7$, journaled in adjustable brackets $a^6$, as shown.

In the practical utilization of the machine the ingredients previously mixed in the receptacle are brought to a consistency suitable for kneading. The receptacle is then placed in the machine and locked in position by the bar I. Rotation of the wheel D will impart a reciprocatory motion to the kneading-head and a periodical partial rotation to the receptacle, whereby the batch of dough is periodically compressed and turned over and re-formed by the blades on the head, the effect on the batch of dough being very similar to the ordinary hand-kneading, but accomplished more quickly and thoroughly and with the expenditure of but a fraction of the labor usually required. When the kneading has been completed, the dough is set aside to rise, either in the kneading receptacle or in any usual or preferred receptacle into which it may be transferred.

The kneading-receptacle being at an inclination keeps the batch of dough together and at the bottom of the receptacle, where it is in position to be acted on most advantageously and where it will not tend to escape through or around the kneading-head nor clog the working parts of the machine.

Having thus described my invention, what I claim as new is—

1. In a machine such as described, the combination with the frame of the receptacle for the dough, the piston-rod and kneader-head, a drive-shaft, connections between the drive-shaft and piston-rod for reciprocating said rod and head, a mutilated pinion carried by said drive-shaft, a mutilated gear-wheel with which said pinion meshes, and means for connecting said gear-wheel and receptacle together, whereby when said drive-shaft is operated the piston-rod will be reciprocated and the receptacle intermittently rotated; substantially as described.

2. In a machine such as described, the combination of the cranked drive-shaft, the pitman connected thereto, the piston-rod and head, the arm adjustably secured to the piston-rod, and connected to the pitman, whereby the position of the head may be varied; substantially as described.

3. In a machine such as described, the combination of the frame set at an inclination, the receptacle for the dough, the reciprocatory piston and means for rotating said receptacle; substantially as described.

4. In a machine such as described, the combination with the frame, of the substantially horizontal dough-receptacle, the rotary driving mechanism, a support for the open end of the receptacle in operative connection with said driving mechanism, and a movable journal at the rear end of the receptacle upon which the receptacle is supported and turns; substantially as described.

5. In a machine such as described, the combination with the frame, of the dough-receptacle journaled to rotate on a substantially horizontal axis, formed with a recess in the bottom, the rotary driving mechanism, a support for the open end of the receptacle in operative connection with said driving mechanism, a bar hinged to one side of the frame, provided centrally with a lug or pin, adapted to enter the recess in the bottom of the receptacle, upon which pin the receptacle is supported and turns; substantially as described.

6. In a machine such as described, the combination of the drive-shaft, the pinion thereon, the large gear-wheel with which the pinion meshes, the hub of said gear-wheel, the cross-arms secured to said hub, the receptacle and means for locking said cross-arms and receptacle together; substantially as described.

7. In a dough-kneading machine, the combination with the receptacle journaled to rotate on an inclined axis and means for rotating the receptacle, of a reciprocatory kneader-head working longitudinally in the receptacle and means for reciprocating the same; substantially as described.

8. In a dough-kneading machine, the combination with the receptacle journaled to rotate on an inclined axis and a driving mechanism with which said receptacle is removably connected, of a kneader-head working in the receptacle, a driving mechanism therefor and means for adjusting the position of the head with respect to its driving mechanism whereby it may be adjusted to work different distances within the receptacle; substantially as described.

9. In a dough-kneading machine, the combination with the receptacle journaled to rotate in a substantially horizontal axis, the piston-rod and kneader-head working horizontally on said receptacle, a drive-shaft, the pitman connected to said drive-shaft and piston-rod, the pinion on the drive-shaft, the gear-wheel on the piston-rod meshing with said pinion; substantially as and for the purpose set forth.

10. In a dough-kneading machine, the combination with the receptacle journaled to rotate on an inclined axis, the piston-rod and kneader-head working horizontally in said receptacle, a drive-shaft, the pitman connected to said shaft and piston-rod, the mutilated pinion on the drive-shaft, the mutilated gear-wheel on the piston-rod with which the pinion meshes; substantially as and for the purpose set forth.

11. In a dough-kneading machine, the combination with the receptacle journaled to rotate on an inclined axis, a driving mechanism therefor and means for removably connecting said receptacle with said driving mechanism, of a reciprocatory rod located in the axial line of said receptacle, a kneader-head on the rod within the receptacle, bearings in which the rod reciprocates and a driving connection coöperating with the rod between its bearings; substantially as described.

LEWIS A. ROBERTS.

Witnesses:
HERMAN ORTHAM,
GEO. HOWELL.